UNITED STATES PATENT OFFICE.

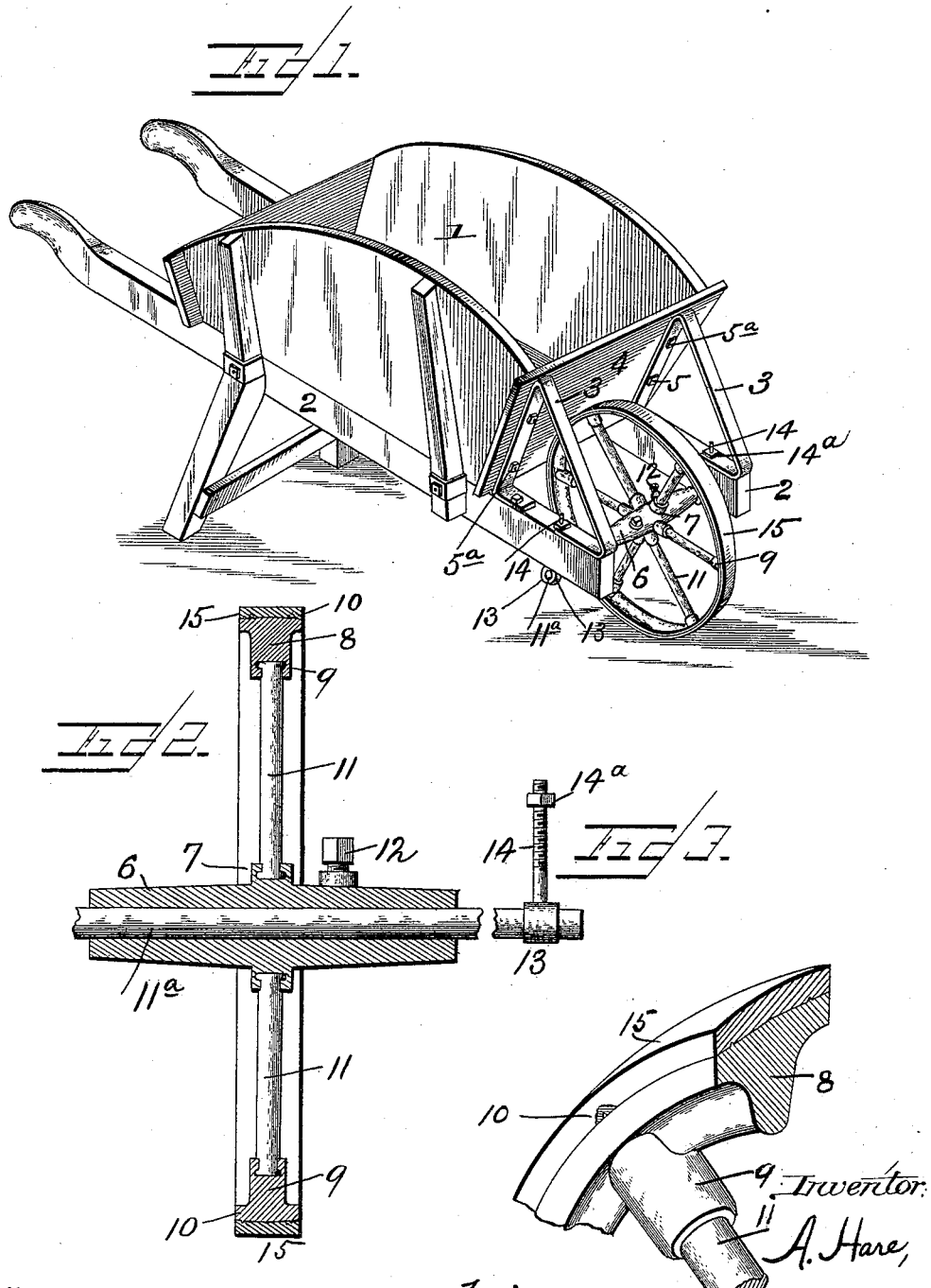

ADAMS HARE, OF ALLEGHENY, PENNSYLVANIA.

WHEELBARROW.

SPECIFICATION forming part of Letters Patent No. 463,897, dated November 24, 1891.

Application filed July 11, 1891. Serial No. 399,187. (No model.)

*To all whom it may concern:*

Be it known that I, ADAMS HARE, a citizen of the United States, residing at Allegheny, in the county of Allegheny and State of Pennsylvania, have invented certain new and useful Improvements in Wheelbarrows; and I do hereby declare the following to be a full, clear, and exact description of the invention, such as will enable others skilled in the art to which it appertains to make and use the same.

My invention consists in new and useful improvements in wheelbarrows, which will be hereinafter fully described and claimed.

Referring to the accompanying drawings, Figure 1 is a perspective view showing a wheelbarrow in which my improvements are embodied. Fig. 2 is a diametrical sectional view taken through the wheel and its end bearings. Fig. 3 illustrates in detail the wheel which forms a part of my invention.

Referring to the several parts by their designating-numerals, 1 indicates the body with the exception of the head, and 2 2 indicate the side bars, of an ordinary wooden wheelbarrow.

Upon the forward portion of the side bars 2 I bolt the two heavy angled supporting-irons 3 3, the inner sides of which bear against and support the head 4 of the wheelbarrow. This head-piece 4, upon which the heavy strain and wear always falls, instead of being supported in the usual manner by wooden blocks, which are certain to split and wear loose, is bolted to the angle supporting-irons 3 by means of bolts 5, having nuts $5^a$ on their threaded ends, so that when the wooden head 4 becomes worn it can be readily removed by unscrewing the nuts $5^a$ and as readily replaced by a new one.

The long hub 6 of the wheel of my wheelbarrow is usually made of cast-iron and is formed at the middle of its length with the radial sockets 7. This hub is of a length equal to that of the space between the outer ends of the side bars 2 of the wheelbarrow on which it is to be mounted. The rim 8 of the wheel is made of cast-iron and formed on its inner side with the sockets 9 and upon its periphery with the series of teats or cone-shaped points 10. The spokes 11 are of wrought-iron and are simply cut from a straight iron bar and have their ends enlarged, and are then placed in the proper position in the molds, when the hub and rim are cast, the whole wheel being integral in one piece when finished. The outer side or face $8^a$ of the wheel-rim 8 is convex in cross-section, so that when the tire 15, which has been previously heated, is placed on the wheel-rim it will as it cools first bind on the center of the rim, which is its highest point, and will contract on each side of the center. It will be seen that by this peculiar construction of the rim it will be impossible for the tire to get loose or come off. As an additional means of securing the tire, I provide the series of small teats or points 10, which are formed integrally with the rim and press into the hot tire as it is placed in position. The wheel is secured on an iron spindle or axle $11^a$, which passes through the hub of the wheel, and the hub is secured to the spindle by means of set-screws 12, passing through the hub, whereby it will be seen that said hub will not be subjected to frictional wear. The ends of the spindle $11^a$ are mounted and revolve in eyes or bearings 13, formed in the enlarged heads or lower ends of bolts 14, which pass up through the bars 2 and the angled supporting-irons 3 and are secured by nuts $14^a$, screwed on their threaded upper ends. It will thus be seen that when the ends of the revolving spindle become worn it can be readily taken out and replaced by a new one.

My new and improved wheelbarrow, it will be seen from the foregoing description, taken in connection with the accompanying drawings, is exceedingly light, strong, and durable in its construction, while those parts which are subject to wear can be readily removed and replaced by new ones.

Having thus described my invention, what I claim, and desire to secure by Letters Patent, is—

In a wheelbarrow, the combination, with the axle-spindle, of the wheel comprising the hub mounted on said spindle and having the radial sockets, the set-screws taking through the hub and binding upon the axle-spindle, the rim having a periphery of convex form in cross-section and also having radial teats or points, spokes connecting the rim and hub, and a metal tire shrunk upon the rim, substantially as and for the purpose set forth.

In testimony whereof I affix my signature in presence of two witnesses.

ADAMS HARE.

Witnesses:
W. H. LEMON,
WM. L. MONRO.